W. WARREN.
Plow.
No. 30,170. Patented Sept. 25, 1860.
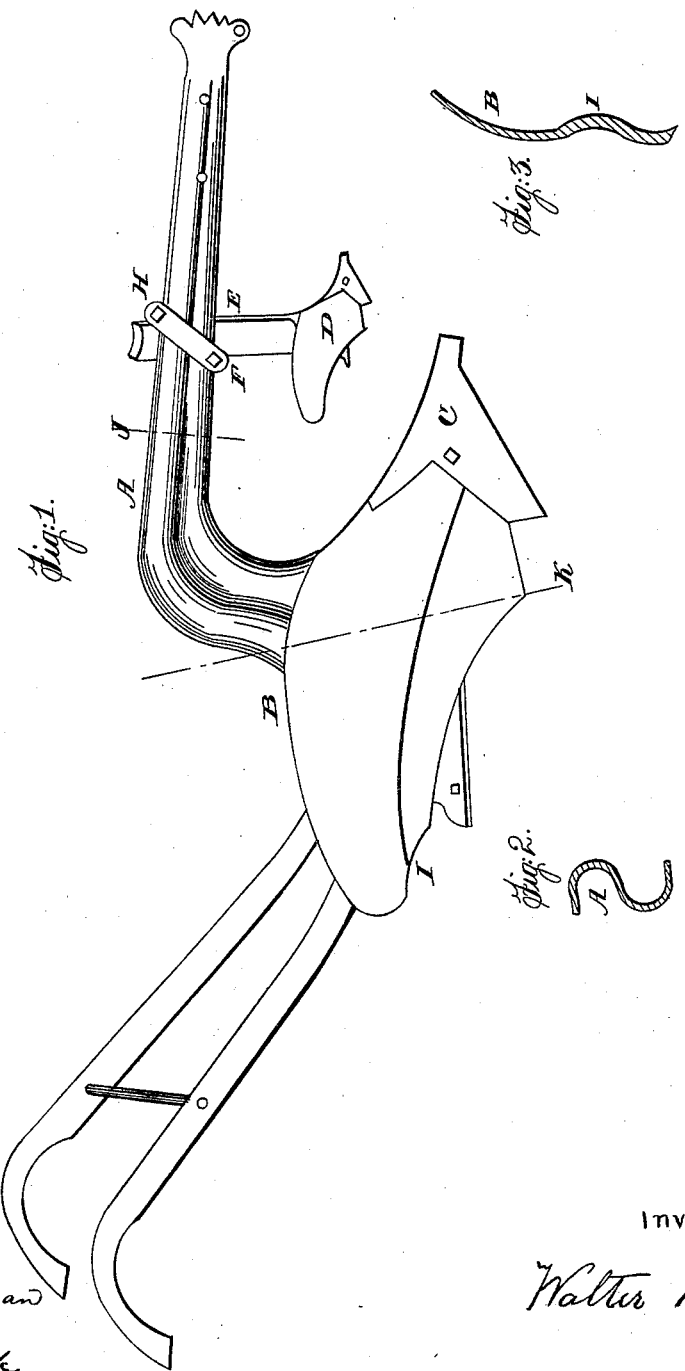
Witnesses:
Wm A Coleman
Wm Comstock
Inventor:
Walter Warren

UNITED STATES PATENT OFFICE.

WALTER WARREN, OF PENN YAN, NEW YORK.

IMPROVEMENT IN PLOWS.

Specification forming part of Letters Patent No. 30,170, dated September 25, 1860.

*To all whom it may concern:*

Be it known that I, WALTER WARREN, of Penn Yan, in the county of Yates and State of New York, have invented a new and useful Improvement in Plows; and I do hereby declare that the following is a full, clear, and exact description of the construction and operation of the same, reference being had to the annexed drawings, making a part of this specification, in which—

Figure 1 is a furrow-side view of the whole plow. Fig. 2 is a transverse vertical section of the beam. Fig. 3 is a section of the mold-board.

The letters of reference refer to the same parts in each figure.

A is the beam. It is made of iron. It is made longer than beams of ordinary construction. It is united to the mold-board by a firm joint, and is held by bolts. The hind and lower parts constitute a part of the landside of the plow, and to it the landside-strip is fastened with bolts, so as to be readily removed when worn out. The rear portion is made to receive the left handle and hold the same by means of bolts or loops. The forward end is made to receive a clevis or other means of attachment that may be desired. The beam from the forward end to near its union with the mold-board is curved and tapering, as shown in Fig. 1, and a transverse vertical section is shown by Fig. 2, made at the dotted line J, Fig. 1, where the contour is similar to the letter S; or the landside surface is a cyma recta and the other side is a cyma reversa, nearly, and of uniform thickness throughout the section; or the hollows and rounded parts are as much hollow and round as the strength requires or as may be conveniently molded by the manufacturer. This shape extends from the forward end of the beam to near its union with the mold-board.

B is the mold-board. It is made to receive the beam A within the forward part by means of the landside portion extending backward so as to form a union with the beam and be secured by bolts, so that the nuts of the bolts may be easily turned inside of the plow. The forward end is made to receive the share. The hind end is made to receive and hold the right handle at the inner side by means of loops or bolts. The outer or furrow surface is made of sufficient length and general spiral shape to turn the furrow, and a special rib or ridge, I, extending the entire length. This ridge begins at the share, about equidistant between the end of the wing of the share and the landside of the plow, so that it may be near the middle of the furrow, and it extends to the rear end of the mold-board in the line of direction that the middle of the furrow takes, so that it may more perfectly pulverize the soil and cause the furrow to be uniformly turned; and by means of this ridge the furrow will keep the plow steady while it is being moved. This ridge is designated by the letter I in Figs. 1 and 3.

C is the share, of ordinary construction.

D is the mold-board of the fore plow, which is to be used, conjointly with the main plow, to turn over the corner of the furrow, so that all grass or weeds may be more effectually turned under when the main plow turns the furrow over.

The standard E of the fore plow is made round on the side that goes next to the beam. It is made round so as to be more easily adjusted. It is held to the beam A and in position by a clasp, and is adjusted by loosening the nut F and tightening the nut H when the fore plow is wanted to cut a narrower furrow, and the reverse when it is wanted to cut a wider furrow; and by means of the taper of the beam the fore plow may have its pitch increased or diminished by moving it backward or forward on the beam A.

E is the standard of the fore plow above described.

F, G, and H constitute the clasp that holds the standard of the fore plow to the beam A.

I is the rib or ridge of the mold-board B above specified.

J is a dotted line showing that place in the beam where Fig. 2 is made to represent the section.

K is a dotted line showing that place in the mold-board where Fig. 3 is made to represent the section.

What I claim as my invention, and desire to secure by Letters Patent, is—

The arrangement of the beam A, when made from its forward part to near its union with the mold-board as described, with the standard E of the fore plow, D, and mold-board B, as specified, for the purposes set forth.

WALTER WARREN.

Witnesses:
 WM. A. COLEMAN,
 WM. COMSTOCK.